(12) United States Patent
Chiang

(10) Patent No.: US 6,343,631 B1
(45) Date of Patent: Feb. 5, 2002

(54) WOOD PLANING MACHINE

(76) Inventor: Pei-Lieh Chiang, No. 12, Nan-Ping Rd., Nan Dist., Taichung City (TW)

( * ) Notice: Subject to any disclaimer, the term of this patent is extended or adjusted under 35 U.S.C. 154(b) by 0 days.

(21) Appl. No.: 09/752,351

(22) Filed: Dec. 29, 2000

(51) Int. Cl.[7] .............................. B27M 1/08; B27C 1/00; B27C 9/00
(52) U.S. Cl. ........................ 144/3.1; 144/47; 144/48.3; 144/117.1; 144/286.5
(58) Field of Search .......................... 144/1.1, 47, 48.3, 144/114.1, 117.1, 130, 286.5, 3.1

(56) References Cited

U.S. PATENT DOCUMENTS

| 624,882 | A | * | 5/1899 | Unkrich | 144/47 U X |
|---|---|---|---|---|---|
| 651,448 | A | * | 6/1900 | Richards | 144/47 U X |
| 4,318,432 | A | * | 3/1982 | Howey | 144/48.3 |
| 4,830,069 | A | * | 5/1989 | Milyard | 144/48.3 |
| 5,927,357 | A | * | 7/1999 | Welsh et al. | 144/130 |

* cited by examiner

*Primary Examiner*—W. Donald Bray
(74) *Attorney, Agent, or Firm*—Ladas & Parry

(57) ABSTRACT

A wood planing machine includes a base, two opposite side walls extending upright from the base, two pairs of supporting rods extending upright from the opposite sides of the base, a cutter carriage mounted movably on the supporting rods, a motor mounted on the cutter carriage, a rotatable shaft connected to and driven by the motor and having one end that extends through a vertically extending slot in one of the side walls, and an emery wheel mounted on the end of the shaft.

2 Claims, 5 Drawing Sheets

WOOD PLANING MACHINE

BACKGROUND OF THE INVENTION

1. Field of the Invention

This invention relates to a wood planing machine, more particularly to a wood planing machine having an emery wheel for removing bits on a planed wooden workpiece.

2. Description of the Related Art

Wood planing normally involves a bit-removing operation after planing. Conventionally, a wooden workpiece is planed on a wood planing machine, and is subsequently transferred to a grinding machine that has an emery wheel for removing bits on the planed workpiece. The aforesaid transfer of the workpiece is inconvenient to conduct.

SUMMARY OF THE INVENTION

Therefore, it is an object of the present invention to provide a wood planing machine that is capable of providing both planing and bit-removing functions for a wooden workpiece.

Accordingly, a wood planing machine of this invention comprises: a base having two opposite sides; two opposite side walls extending upright from the opposite sides of the base, one of the side walls having a vertically extending slot formed therein; two pairs of supporting rods respectively extending upright from the opposite sides of the base between the side walls; a cutter carriage mounted movably on the supporting rods between the side walls; a motor mounted on the cutter carriage; a rotary cutter mounted on the cutter carriage and adapted to plane a wooden workpiece; a rotatable shaft connected to and driven by the motor and having one end that extends laterally and outwardly through the slot so as to be movable along the slot when the cutter carriage moves along the slot; and an emery wheel mounted on the end of the shaft and adapted to remove bits on the workpiece after the workpiece is planed.

BRIEF DESCRIPTION OF THE DRAWINGS

In drawings which illustrate an embodiment of the invention.

DETAILED DESCRIPTION OF THE PREFERRED EMBODIMENT

Figure 1:
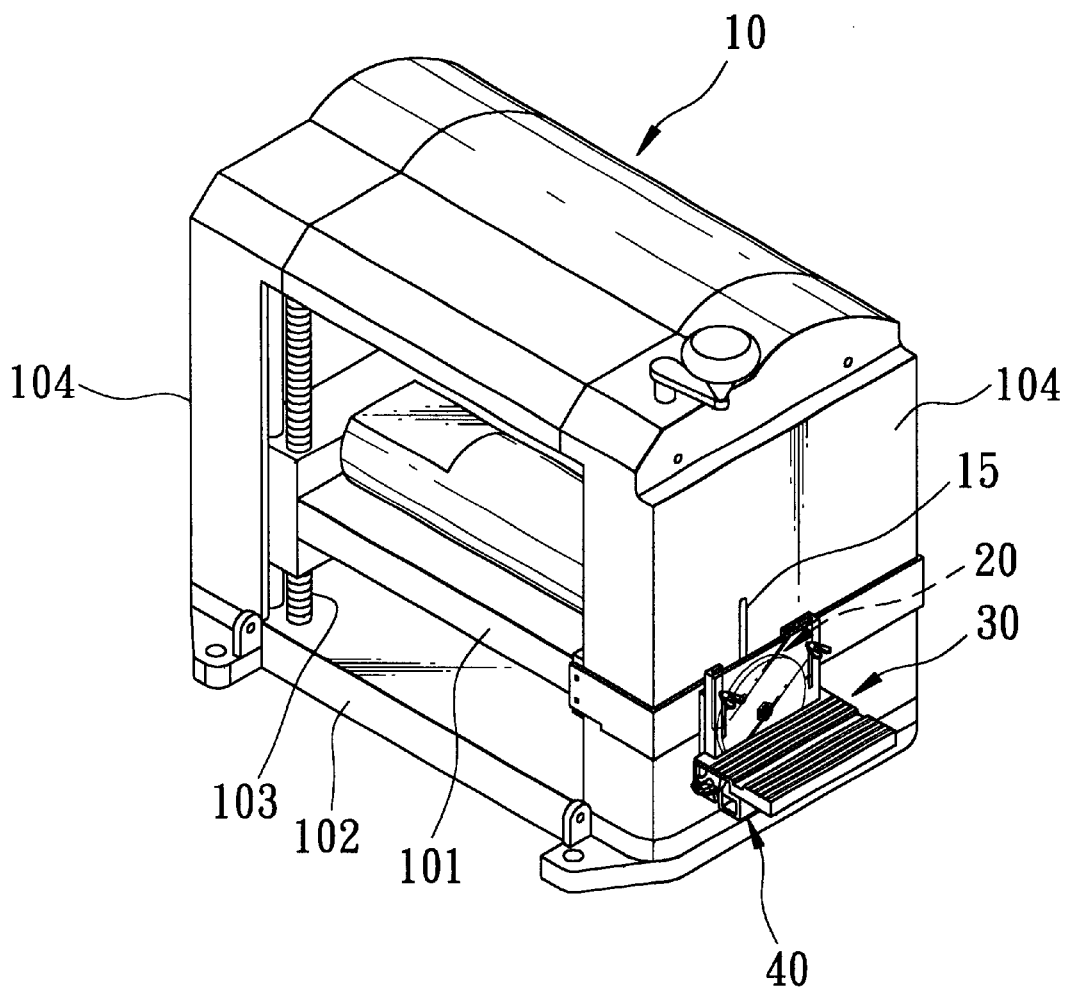
FIG. 1 is a perspective view of a wood planing machine embodying this invention.
Figure 2:
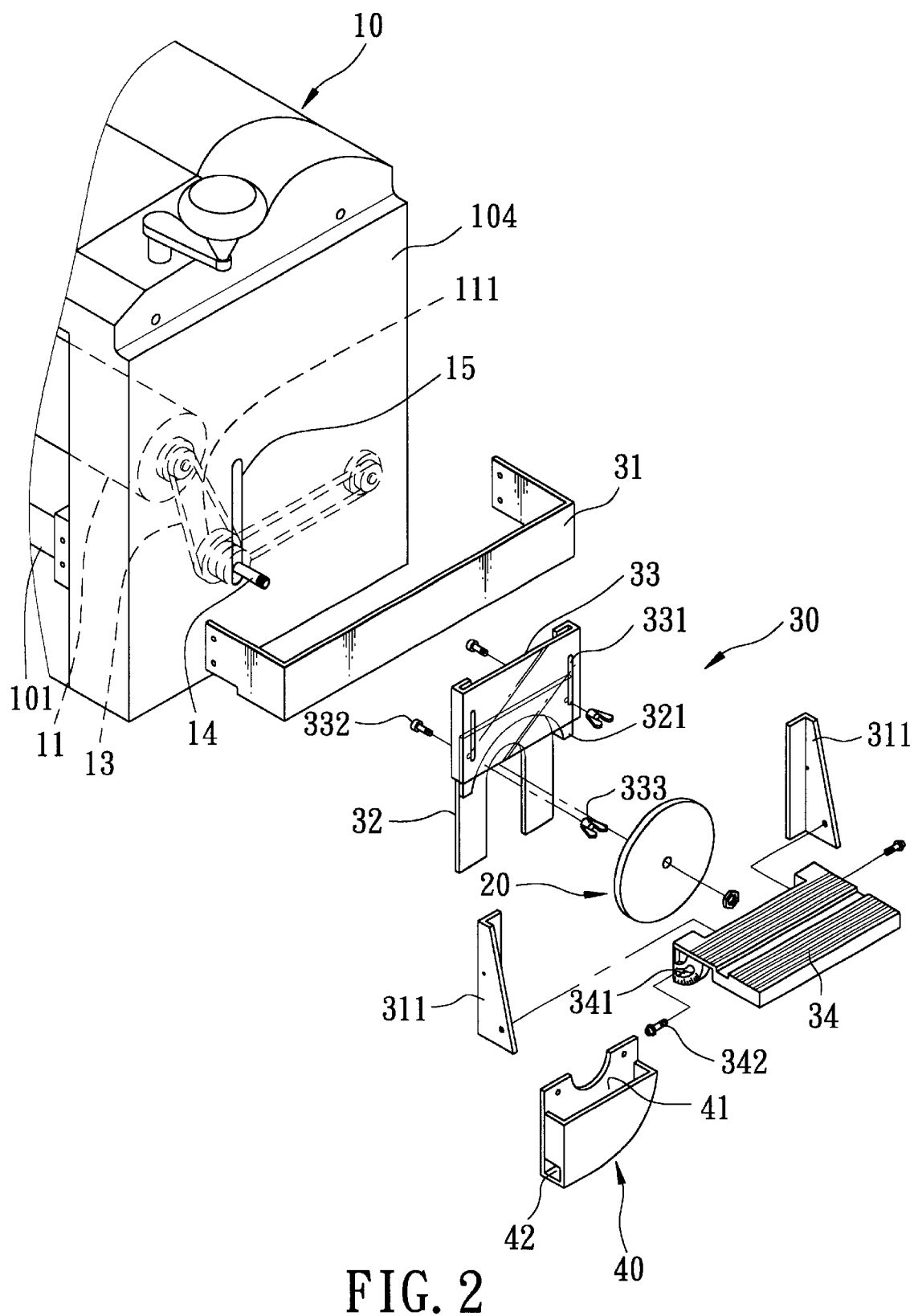
FIG. 2 is a fragmentary exploded view showing an emery wheel on the wood planing machine of FIG. 1.
Figure 3:
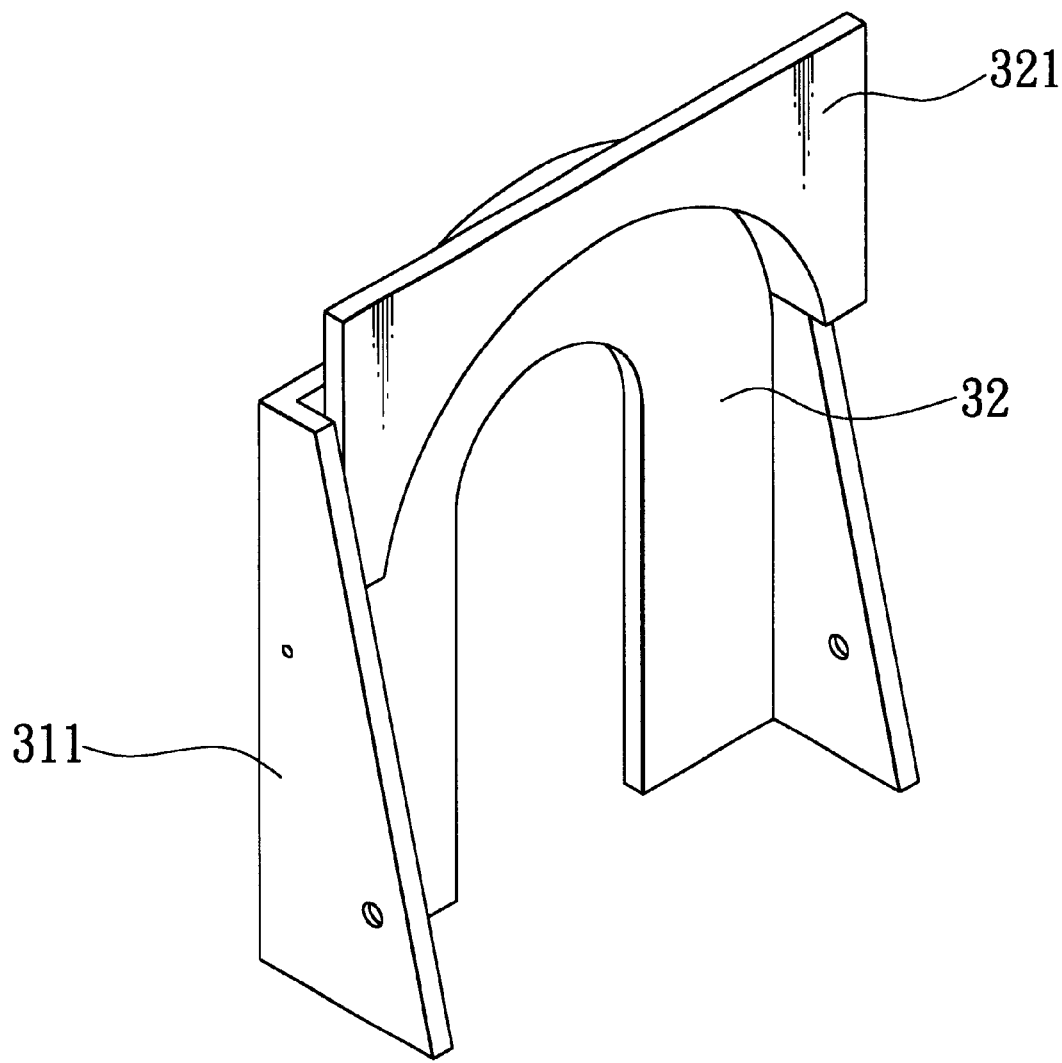
FIG. 3 is a perspective view of assembly of a guide plate and two lug plates on the wood planing machine of FIG. 1.
Figure 4:
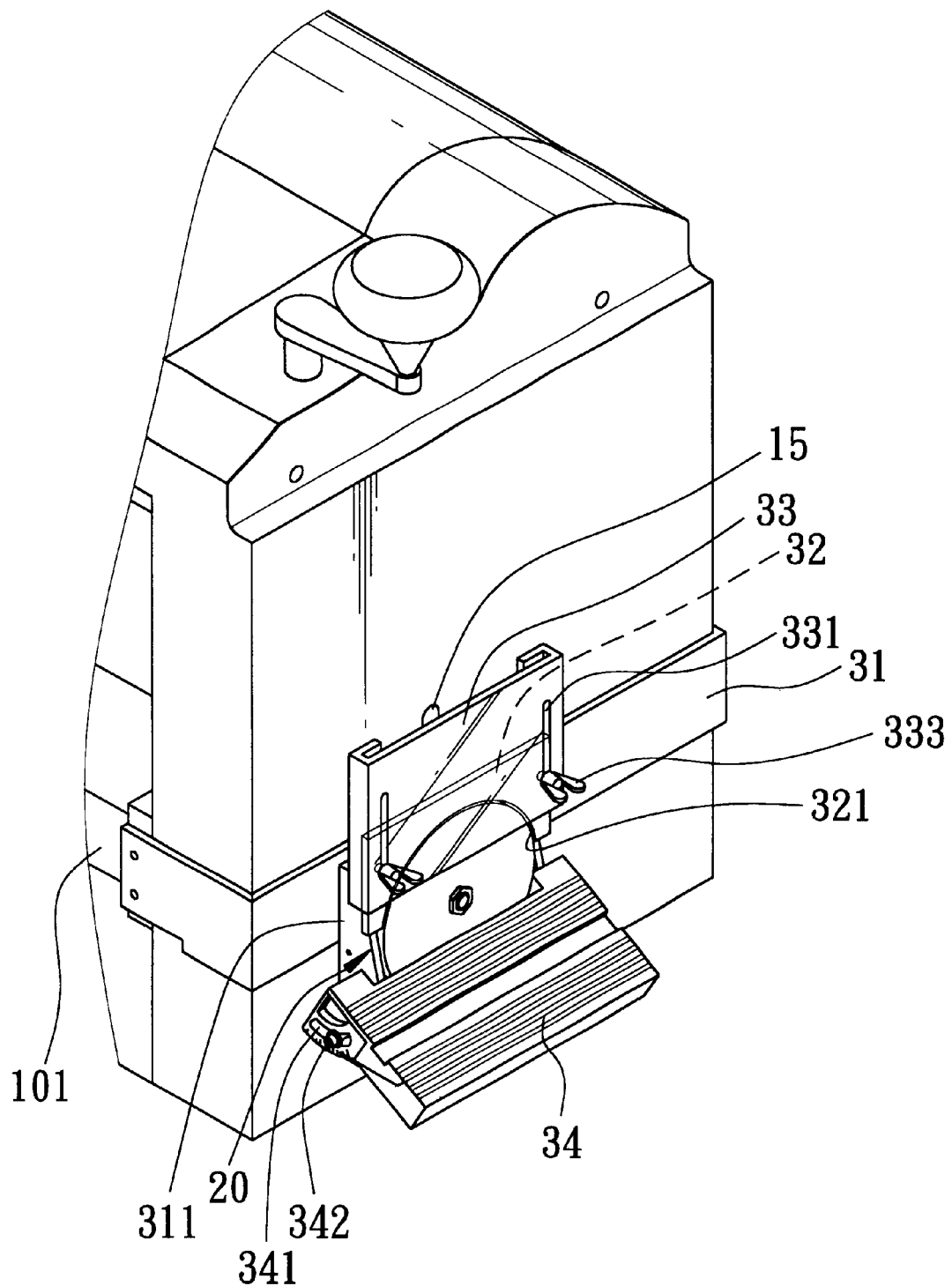
FIG. 4 is a fragmentary perspective view of the wood planing machine of FIG. 1, with a shielding plate moved to a shielding position.

FIGS. 1 to 5 illustrate a wood planing machine 10 embodying this invention. The wood planing machine 10 includes: a base 102 having two opposite sides; two opposite side walls 104 extending upright from the opposite sides of the base 102, one of the side walls 104 having a vertically extending slot 15 formed therein; two pairs of supporting rods 103 respectively extending upright from the opposite sides of the base 102 between the side walls 104; a cutter carriage 101 mounted movably on the supporting rods 103 between the side walls 104; a motor 11 mounted on the cutter carriage 101; a rotary cutter (not shown) mounted on the cutter carriage 101, connected to and driven by the motor 11, and adapted to plane a wooden workpiece (not shown); a rotatable shaft 14 connected to and driven by the motor 11 via a transmission device and having one end that extends laterally and outwardly through the slot 15 so as to be movable along the slot 15 when the cutter carriage 101 moves along the supporting rods 103; and an emery wheel 20 mounted on the end of the shaft 14 and adapted to remove bits on the workpiece after the workpiece is planed. The transmission device includes a transmission belt 13 and a pair of transmission wheels 111 associated with the transmission belt 13 and respectively connected to the motor 11 and the shaft 14.

A U-shaped supporting plate 31 is disposed adjacent to one of the side walls 104 underneath the shaft 14 and extends between the emery wheel 20 and said one of the side walls 104, and has two opposite ends secured to two opposite sides of the cutter carriage 101 so as to be movable together with the cutter carriage 101.

Two lug plates 311 are disposed at two opposite sides of the emery wheel 20, and are secured to the supporting plate 31 by welding.

A vertically extending guide plate 32 is mounted on the lug plates 311 (see FIG. 3), and has an arcuate portion 321 that circumferentially surrounds a top portion of the emery wheel 20.

Figure 5:
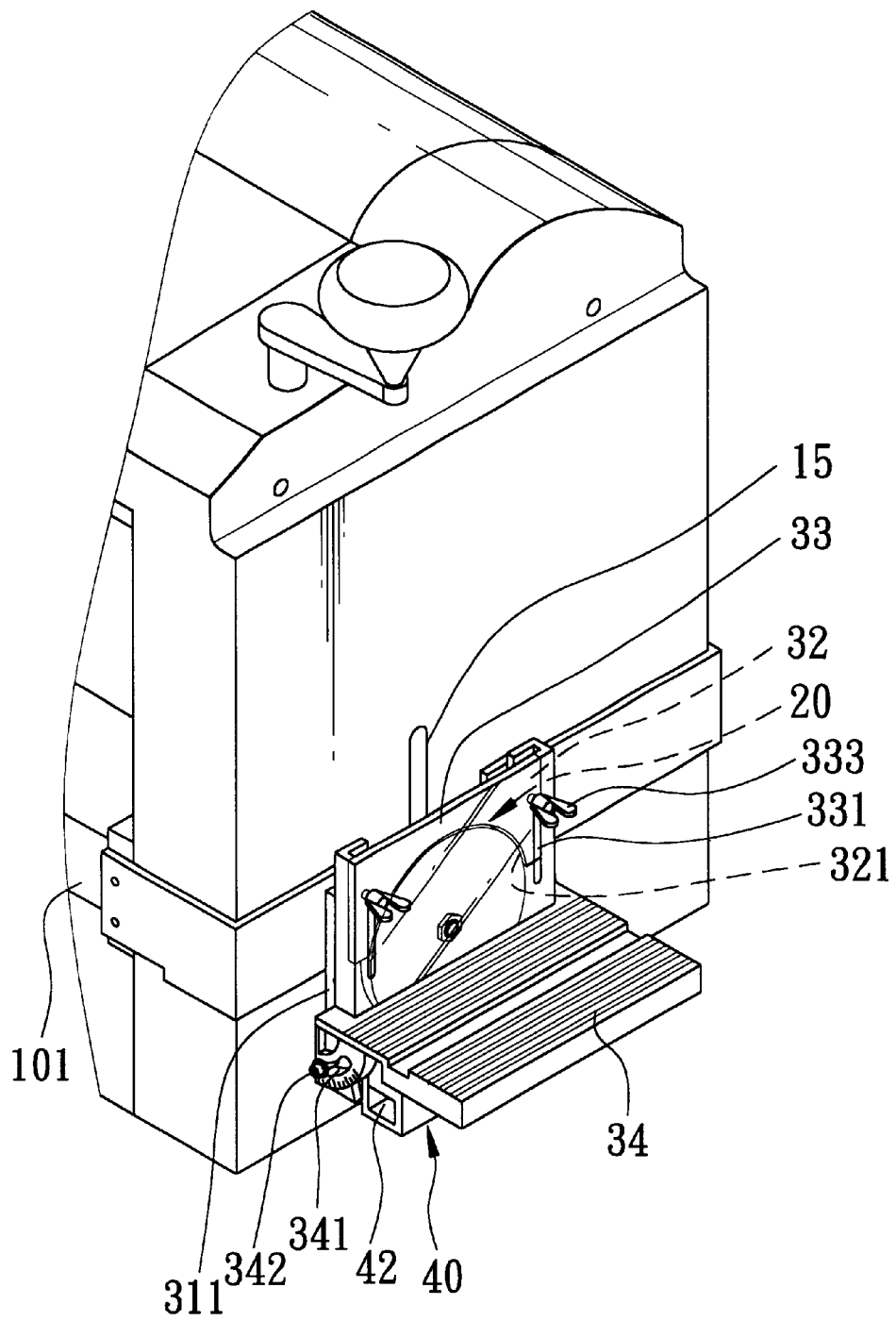
FIG. 5 is a fragmentary perspective view of the wood planing machine of FIG. 1, with the shielding plate moved to an open position.

A vertically extending shielding plate 33 is made of a transparent material, and has a front plate portion and two U-shaped side portions wrapping around two opposite side portions of the arcuate portion 321 of the guide plate 32, and is mounted movably on the guide plate 32 via screw means 332, 333 extending through the guide plate 32 and a pair of parallel slots 331 formed in the front plate portion so as to be movable between a shielding position, in which the shielding plate 33 moves downwardly along the arcuate portion 321 to shield the emery wheel 20 (see FIG. 4), and an open position, in which the shielding plate 33 moves upwardly along the arcuate portion 321 to expose at least a portion of the emery wheel 20 (see FIG. 5).

A worktable 34 is disposed at one side of the emery wheel 20 opposite to the supporting plate 31, and has two opposite ends mounted adjustably and respectively on the lug plates 311. The ends of the worktable 34 are respectively formed with arcuate slots 341, and are secured to the lug plates 311 via screw means 342 extending through the arcuate slots 341 and screw holes in the lug plates 311 so as to permit the worktable 34 to be adjustable to a predetermined angle relative to the emery wheel 20.

A bit-collecting box 40 is mounted on the lug plates 311 below the emery wheel 20, and has an interior 41 that opens upwardly for receiving bits removed from the workpiece, and a discharging outlet 42 formed at a bottom thereof to discharge the bits that were collected therein.

With the emery wheel 20 installed in the wood planing machine 10 of this invention, the inconvenience drawback as encountered in the prior art can be eliminated.

With the invention thus explained, it is apparent that various modifications can be made without departing from the spirit of the present invention. It is therefore intended that the invention be limited only as recited in the appended claims.

I claim:

1. A wood planing machine comprising:

a base having two opposite sides;

two opposite sidewalls extending upright from said opposite sides of said base, one of said side walls having a vertically extending slot formed therein;

two pairs of supporting rods respectively extending upright from said opposite sides of said base between said side walls;

a cutter carriage mounted movably on said supporting rods between said side walls;

a motor mounted on said cutter carriage;

a rotary cutter mounted on said cutter carriage for planing a wooden workpiece;

a rotatable shaft connected to and driven by said motor and having one end that extends laterally and outwardly through said slot so as to be movable along said slot when said cutter carriage moves along said supporting rods;

an emery wheel mounted on said end of said shaft adapted to remove bits on the workpiece after the workpiece is planed;

a U-shaped supporting plate disposed adjacent to said one of said side walls underneath said shaft and extending between said emery wheel and said one of said walls and having two opposite ends secured to two opposite sides of said cutter carriage so as to be movable together with said cutter carriage;

a pair of lug plates disposed at two opposite sides of said emery wheel and secured to said supporting plate; and a worktable disposed at one side of said emery wheel opposite to said supporting plate, and having two opposite ends mounted adjustable and respectively on said lug plates, wherein said ends of said worktable are respectively formed with arcuate slots;

screw means extending through said arcuate slots and into said lug plates so as to permit said worktable to be adjustable to a predetermined angle relative to said emery wheel; and a bit-collecting box mounted on said lug plates below said emery wheel and having an interior that opens upwardly for receiving bits removed from the workpiece.

2. The wood planing machine of claim 1, further comprising a vertically extending guide plate mounted on said lug plates and having an arcuate portion that circumferentially surrounds a top portion of said emery wheel, and a shielding plate mounted movably on said arcuate portion of said guide plate so as to be movable between a shielding position, in which said shielding plate moves downwardly along said arcuate portion to shield said emery wheel, and an open position, in which said shielding plate moves upwardly along said arcuate portion to expose at least a portion of said emery wheel.

* * * * *